(12) United States Patent
Bailey

(10) Patent No.: US 9,380,770 B1
(45) Date of Patent: Jul. 5, 2016

(54) CHUMMER AND LINE EXTENDER

(71) Applicant: Kevin F Bailey, Pensacola, FL (US)

(72) Inventor: Kevin F Bailey, Pensacola, FL (US)

( * ) Notice: Subject to any disclaimer, the term of this patent is extended or adjusted under 35 U.S.C. 154(b) by 142 days.

(21) Appl. No.: 14/467,012

(22) Filed: Aug. 24, 2014

Related U.S. Application Data

(60) Provisional application No. 61/872,788, filed on Sep. 2, 2013.

(51) Int. Cl.
*A01K 97/02* (2006.01)

(52) U.S. Cl.
CPC ...................................... *A01K 97/02* (2013.01)

(58) Field of Classification Search
CPC ..................................................... A01K 97/02
See application file for complete search history.

(56) References Cited

U.S. PATENT DOCUMENTS

| | | | | | |
|---|---|---|---|---|---|
| 2,719,382 | A | * | 10/1955 | Schachte | A01K 91/06 43/42.06 |
| 9,055,736 | B1 | * | 6/2015 | DeLucca | A01K 93/02 |
| 2002/0029510 | A1 | * | 3/2002 | Stevens | A01K 97/02 43/44.99 |
| 2004/0068916 | A1 | * | 4/2004 | Harris | A01K 97/02 43/44.99 |
| 2006/0218848 | A1 | * | 10/2006 | Melhorn | A01K 97/02 43/44.99 |
| 2012/0066954 | A1 | * | 3/2012 | Barker | A01K 97/02 43/4 |
| 2014/0250761 | A1 | * | 9/2014 | Preller, Jr. | A01K 97/12 43/17 |

* cited by examiner

*Primary Examiner* — Gary Hoge
(74) *Attorney, Agent, or Firm* — Peter Loffler

(57) ABSTRACT

A chummer and line extender is a hollow tubular member with a first end that is securable to a fixed structure such as a tree trunk and a second end from which a shock line extends, the end of the line secured to an appropriate fishing rig. Pulling on the line causes a spring within the tubular member to compress thereby absorbing shock on the line. Port holes on the tubular member and/or on a cap on the second end allow slow release discharge of chum from the tubular member.

8 Claims, 4 Drawing Sheets

CHUMMER AND LINE EXTENDER

This application claims the benefit of U.S. provisional patent application No. 61/872,788, filed on Sep. 2, 2013, which provisional application is incorporated herein by reference in its entirety.

BACKGROUND OF THE INVENTION

1. Field of the Invention

The present invention relates to a chummer that is ideally suited for limb line fishing as well as a line extended to which fishing line is secured.

2. Background of the Prior Art

Limb line fishing is a type of passive fishing wherein one or more baited hooks are placed into the water with the opposing end of the line on which the hooks are located tied to an appropriate surface, such as a limb of a tree or a bush. Once the line is set, the fisherman leaves and returns several hours or sometimes even days later to see what, if any bounty may be present on the hooks. The reason for tying the distal end of the line to a tree limb or a bush is so that the line has some give when a prey is biting or striking the line or is actually hooked. Without such give, the prey may break the line or otherwise rip out the hook. The tree limb or bush act as a shock absorber for the line. The problem with such an arrangement is that when a prey is fighting on the line, the limb or bush bends, giving a telltale sign to others that a prey is hooked, or about to be hooked onto a line. With the legitimate fisherman gone for several hours or possibly even days, unscrupulous poachers have been known to canvas known limb line fishing areas looking for tree limbs and bushes that bend in the telltale sign of having a limb line with a fish attached thereto, in hopes of poaching someone else's catch.

Another problem with limb line fishing is that although the fisherman can chum the waters upon casting the line, once the fisherman leaves and the chum dissipates, there is no further attractant to lure the fish to the line, often resulting in an empty hook upon the fisherman's return.

A device is needed that overcomes the above stated shortcomings in limb line fishing. Specifically, such a device must allow the fishing line to give whenever prey bites, strikes, or is caught on the line, without the telltale sign of a tree limb or bush bending or swaying. Such a device must be able to chum the water for a substantial amount of time after the fisherman has departed after the initial cast of the line.

SUMMARY OF THE INVENTION

The chummer and line extender of the present invention addresses the aforementioned needs in the art by providing a limb line fishing system that allows the line to have some give whenever prey bites, strikes, or is caught on the line, so as to prevent the line from snapping or the prey from tearing off the hook, and without the telltale signs of limb or bush swaying so as to prevent unscrupulous poachers from spotting an active limb line. The chummer and line extender chums the water for several hours without intervention from the fisherman. The chummer and line extender of the present invention is simple in design and construction, being produced using standard manufacturing techniques, so as to make the device readily affordable and thus economically attractive to potential consumers for this type of device. The chummer and line extender is easy to use and maintain. The chummer and line extender can be made in a variety of sizes in order to be used in a variety of fishing settings.

The chummer and line extender of the present invention is comprised of a hollow tubular body member that has a first end and a second end. A first cap is attached, fixedly or removably, to the first end of the body member. A second cap is removably attached to the second end of the body member. A spring has a third end that abuts the first cap and also has a fourth end that abuts the second cap. A line has a fifth end secured between the spring and the first cap and passes out through an opening in the second cap. The line also has a sixth end to which a desired fishing rig is attached, such that when a pulling force is exerted on the sixth end, the third end of the spring is compressed toward the fourth end thereby gradually decelerating the pulling force on the line. An eye bolt is attached to the first cap. A series of first openings encircle the body member proximate the second end while a series of second openings encircle the second cap.

BRIEF DESCRIPTION OF THE DRAWINGS

Similar reference numerals refer to similar parts throughout the several views of the drawings.

DESCRIPTION OF THE PREFERRED EMBODIMENT

Figure 1:
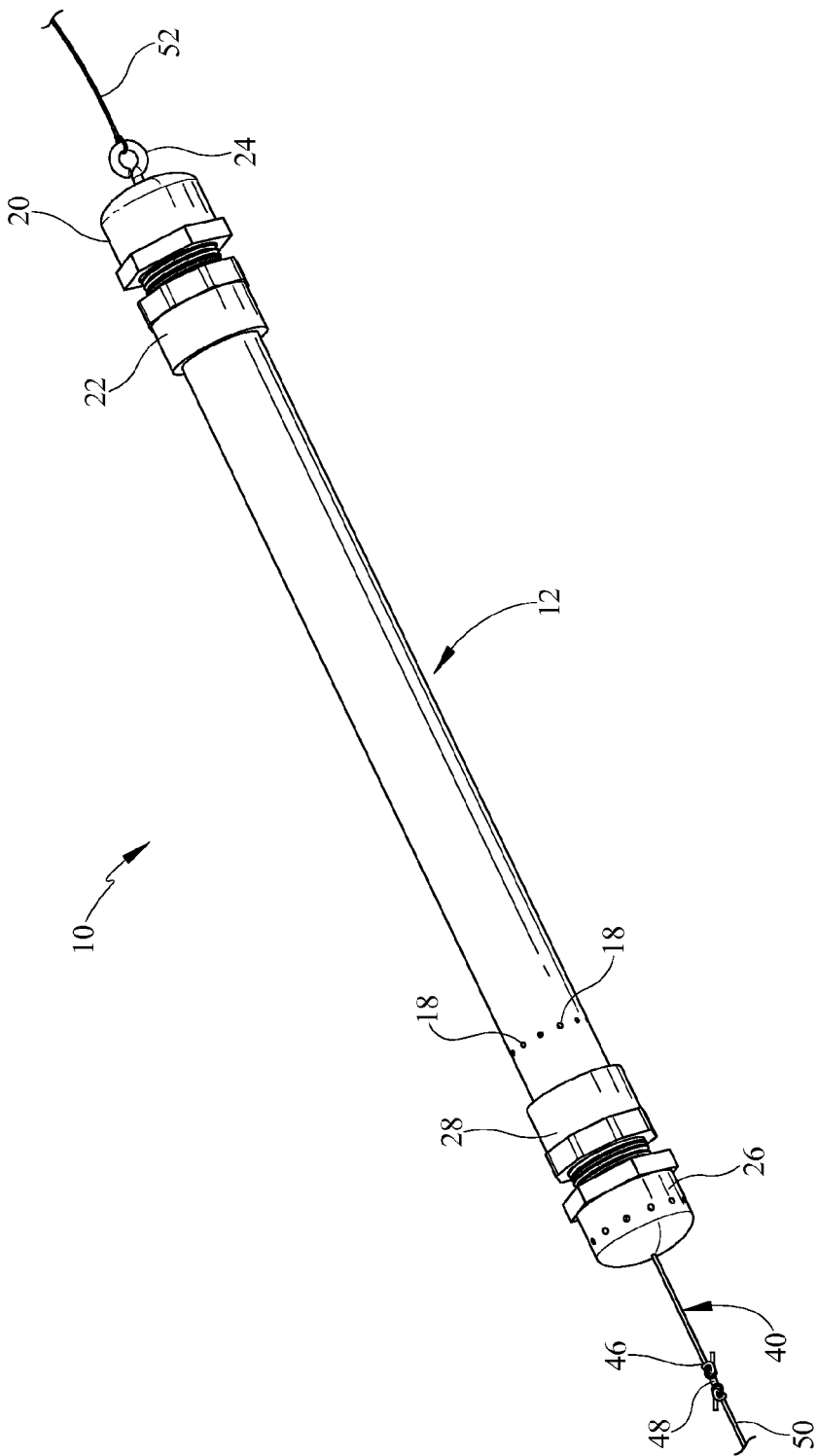
FIG. 1 is a perspective view of the chummer and line extender of the present invention.
Figure 2:
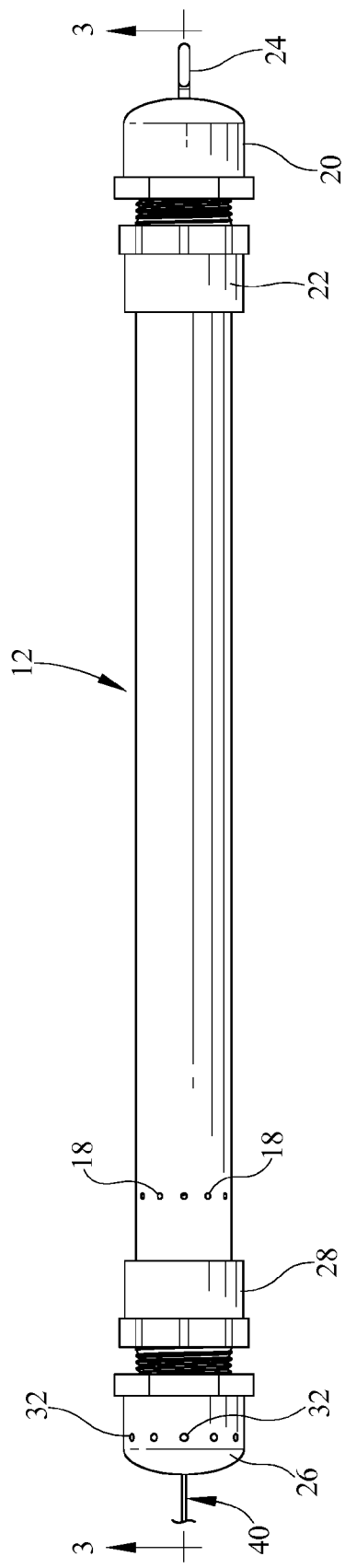
FIG. 2 is a side elevation view of the chummer and line extender.
Figure 3:
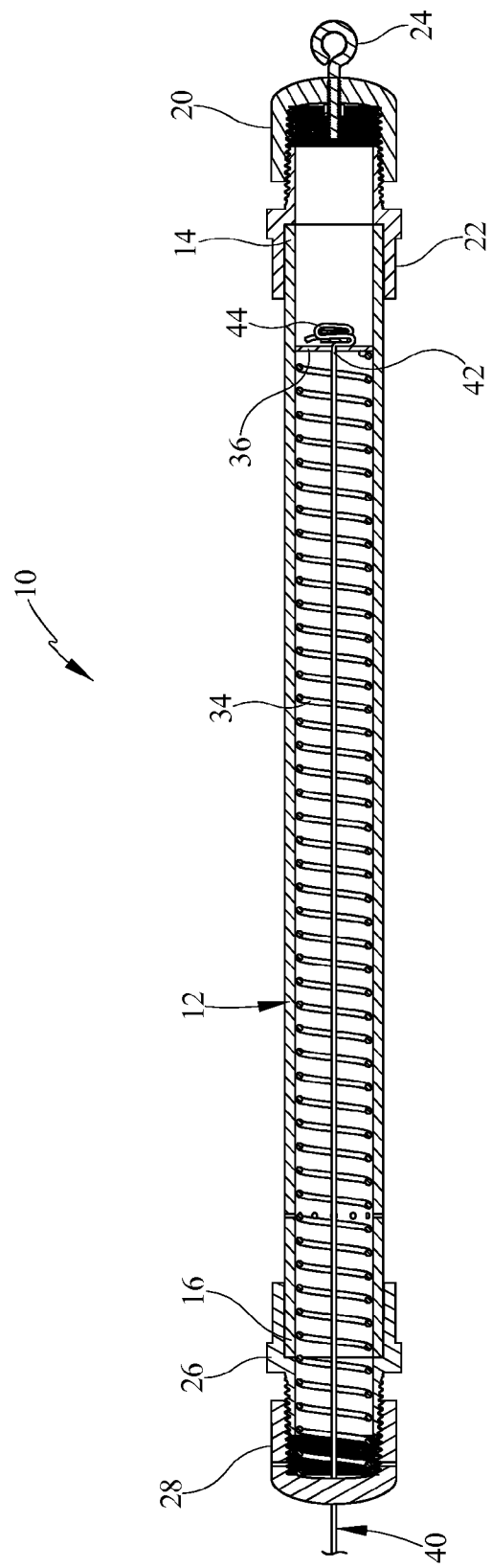
FIG. 3 is a sectioned view of the chummer and line extender taken along line 3-3 in FIG. 2.
Figure 4:
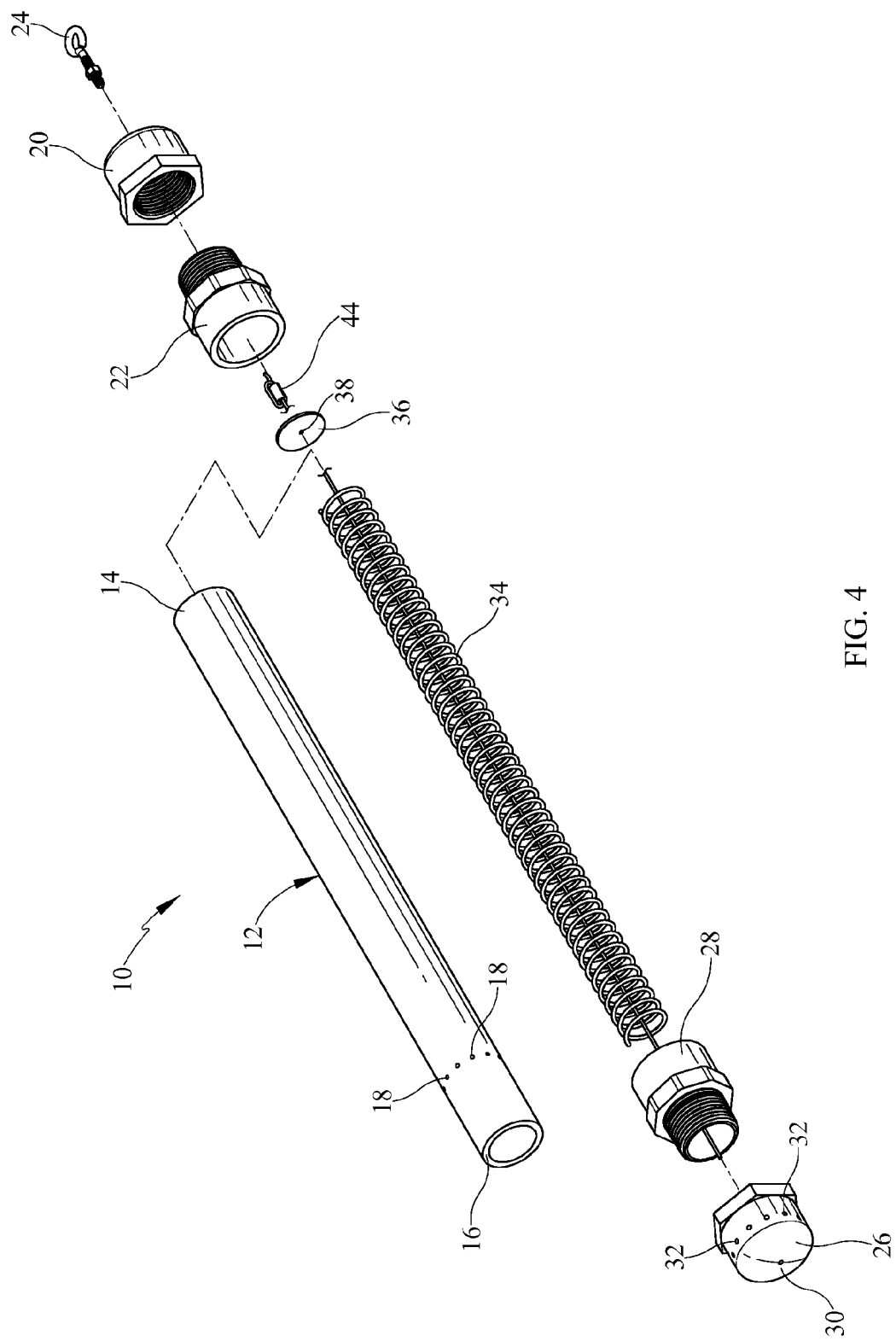
FIG. 4 is an exploded view of the chummer and line extender.

Referring now to the drawings, it is seen that the chummer and line extender of the present invention, generally denoted by reference numeral 10, is comprised of a hollow tubular body member 12 having a first end 14, and a second end 16. Encircling the body member 12 proximate the second end 16 is a series of first chum port holes 18. As seen, a first cap 20 is removably secured to the first end 14 of the body member in appropriate fashion, such as via the illustrated first male adapter 22, the first male adapter 22 secured to the first end 14 of the body member 12 in appropriate fashion, and the first cap 20 threadably secured to the first male adapter 22. An eye bolt 24 is attached to first cap 20.

As also seen, a second cap 26 is removably secured to the second end 16 of the body member 12 in appropriate fashion, such as via the illustrated second male adapter 28, the second male adapter 28 secured to the first end 14 of the body member 12 in appropriate fashion, and the second cap 26 threadably secured to the second male adapter 28. An opening 30 is centrally located on an end of the second cap 26 while a series of second chum port holes 32 encircle the second cap 26.

A spring 34 is disposed within hollow interior of the body member 12 and abuts the first cap system and the second cap system, specifically against the first male adapter 22 and the second male adapter 28 respectively. A disk member 36 having an opening 38 is disposed between the spring 34 and the first male adapter 22. A shock line 40 has its first end 42 passing through the opening 38 of the disk member 36 and is secured thereto in appropriate fashion such as via the illustrated double cross 44—of course this end 42 of the shock line 40 can be secured on this side of the disk member 36 via various other means including simply being knotted. The shock line 40 passes through the spring 34 and through the opening 30 on the second cap 26. The second end 46 of the shock line 40 has appropriate securement means 48 thereon, of any appropriate design, to which a fishing line 50 is secured as desired.

The body member 12, the first male adapter 22, the second male adapter 28, the first end cap 20, and the second end cap 26 are all made from an appropriate sturdy material, such as PVC, etc., (which allows for the chummer and line extender 10 to be made in a variety of sizes) while the spring 34, the eye bolt 24, and the disk member 36 are also made from a sturdy material, such as stainless steel in order to help prevent rusting, but can be made of plastic or other materials.

In order to use the chummer and line extender 10 of the present invention, the second end cap 26 is removed and the hollow interior of the body member 12 is filled with an appropriate chum such as dough ball baits (not illustrated) and the second end cap 26 is secured back onto the body member 12. A fishing line 50 is rigged as desired and secured to the second end 46 of the line 40 in appropriate fashion. A string 52 is used to secure the body member 12 to an appropriate structure such as a tree trunk (not illustrated) and the body member 12 is cast into the water. The body member 12 soon fills with water and sinks, out of sight of potential poachers. The bait within the body member 12 slowly dissolves in the water and is discharged out of the chum port holes 18 and 32 (it is understood that only one set of port holes 18 or 32 need to be provided in order to make the chummer 10 operationally effective) over several hours so that the chummer and line extender 10 need not be attended for a substantial amount of time. If a prey bites, strikes or is caught on the fishing line 50, any fight from the prey causes the shock line 40 to pull against the compression spring 34, which acts as a shock absorber to help prevent the fishing line 50 from breaking or the prey from tearing away. As the spring 34 provides the shock absorbing ability for the chummer and line extender 10, the chummer and line extender 10 need not be attached to a resilient tree limb or bush, but rather can be attached to a fixed item, such as a tree trunk, or even a rock, so that when prey is biting, striking, or caught, there is no telltale tree limb branch bending or bush swaying so that potential poachers will not be able to spot the chummer and line extender 10 from the typical telltale signs.

While the invention has been particularly shown and described with reference to an embodiment thereof, it will be appreciated by those skilled in the art that various changes in form and detail may be made without departing from the spirit and scope of the invention.

I claim:

1. A chummer comprising:
    a hollow tubular body member having a first end and a second end;
    a first cap attached to the first end of the body member;
    a second cap removably attached to the second end of the body member;
    a spring having a third end, the spring also having a fourth end abutting the second cap; and
    a line having a fifth end secured between the spring and the first cap and passing out through an opening in the second cap, the line also having a sixth end, such that when a pulling force is exerted on the sixth end, the third end of the spring is compressed toward the fourth end.

2. The chummer as in claim 1 further comprising an eye bolt attached to the first cap.

3. The chummer as in claim 2 further comprising a series of first openings encircling the body member proximate the second end.

4. The chummer as in claim 3 further comprising a series of second openings encircling the second cap.

5. The chummer as in claim 2 further comprising a series of openings encircling the second cap.

6. The chummer as in claim 1 further comprising a series of first openings encircling the body member proximate the second end.

7. The chummer as in claim 6 further comprising a series of second openings encircling the second cap.

8. The chummer as in claim 1 further comprising a series of openings encircling the second cap.

* * * * *